(12) United States Patent
Furubayashi et al.

(10) Patent No.: US 11,534,950 B2
(45) Date of Patent: Dec. 27, 2022

(54) RUBBER EXTRUSION DEVICE AND METHOD FOR MANUFACTURING RUBBER EXTRUDATE

(71) Applicant: The Yokohama Rubber Co., LTD., Tokyo (JP)

(72) Inventors: Yuki Furubayashi, Hiratsuka (JP); Satoru Nishio, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 302 days.

(21) Appl. No.: 16/641,147

(22) PCT Filed: Jun. 7, 2018

(86) PCT No.: PCT/JP2018/021896
§ 371 (c)(1),
(2) Date: Feb. 21, 2020

(87) PCT Pub. No.: WO2019/039041
PCT Pub. Date: Feb. 28, 2019

(65) Prior Publication Data
US 2020/0198207 A1  Jun. 25, 2020

(30) Foreign Application Priority Data
Aug. 21, 2017 (JP) .............................. JP2017-158752

(51) Int. Cl.
*B29C 48/92* (2019.01)
*B29C 48/25* (2019.01)
(Continued)

(52) U.S. Cl.
CPC .......... *B29C 48/266* (2019.02); *B29C 48/397* (2019.02); *B29C 48/92* (2019.02);
(Continued)

(58) Field of Classification Search
None
See application file for complete search history.

(56) References Cited

U.S. PATENT DOCUMENTS

| 3,830,610 A | 8/1974 | Ohkawa et al. |
| 2002/0063357 A1 | 5/2002 | Ohki |

(Continued)

FOREIGN PATENT DOCUMENTS

| CN | 1558820 | 12/2004 |
| CN | 103201083 | 7/2013 |

(Continued)

OTHER PUBLICATIONS

Shibano JP2013216069 English Translation 2013 (Year: 2013).*
(Continued)

*Primary Examiner* — Jacob T Minskey
*Assistant Examiner* — Adrien J Bernard
(74) *Attorney, Agent, or Firm* — Thorpe North & Western

(57) ABSTRACT

A rubber extrusion device comprises a control plate having an adjustment flow path communicating with an extrusion flow path formed in a head and an extrusion port formed in a die is interposed between the head and the die; the control plate is slid along and between the head and the die to change a position of a communication region of the extrusion flow path with respect to the adjustment flow path at a leading end opening of the extrusion flow path to set the control plate at a desired position; and unvulcanized rubber, obtained by mixing and kneading rubber material while extruding the rubber material forward with a screw, passes through the extrusion flow path and the adjustment flow path to be extruded from the extrusion port.

11 Claims, 8 Drawing Sheets

(51) Int. Cl.
    *B29C 48/395* (2019.01)
    *B29C 48/03* (2019.01)
    *B29C 48/06* (2019.01)

(52) U.S. Cl.
    CPC ............ *B29C 48/06* (2019.02); *B29C 48/131* (2019.02); *B29C 2948/92171* (2019.02); *B29C 2948/92666* (2019.02); *B29C 2948/92904* (2019.02)

(56) References Cited

U.S. PATENT DOCUMENTS

| | | |
|---|---|---|
| 2003/0057592 A1 | 3/2003 | Grover |
| 2013/0221557 A1 | 8/2013 | Yonesato et al. |
| 2013/0334722 A1 | 12/2013 | Kitamura et al. |
| 2017/0320282 A1 | 11/2017 | Kitamura et al. |
| 2019/0358881 A1 | 11/2019 | Rubber |

FOREIGN PATENT DOCUMENTS

| | | |
|---|---|---|
| EP | 1 211 049 | 6/2002 |
| EP | 3 584 057 | 12/2019 |
| JP | S50-020593 | 7/1975 |
| JP | S60-097824 | 5/1985 |
| JP | H02-034450 | 2/1990 |
| JP | H03-143609 | 6/1991 |
| JP | 2000-289084 | 10/2000 |
| JP | 2008-126560 | 6/2008 |
| JP | 2009-061691 | 3/2009 |
| JP | 2012-091340 | 5/2012 |
| JP | 2012-187712 | 10/2012 |
| JP | 2013-216069 | 10/2013 |
| JP | 2014-172250 | 9/2014 |
| WO | WO 03/026863 | 4/2003 |
| WO | WO 2012/063891 | 5/2012 |
| WO | WO 2012/121148 | 9/2012 |
| WO | WO 2018/150733 | 8/2018 |

OTHER PUBLICATIONS

Tsubotani JP2014172250 English Translation 2014 (Year: 2014).*
International Search Report for International Application No. PCT/JP2018/021896 dated Jul. 10, 2018, 4 pages, Japan.

\* cited by examiner

RUBBER EXTRUSION DEVICE AND METHOD FOR MANUFACTURING RUBBER EXTRUDATE

TECHNICAL FIELD

The present technology relates to a rubber extrusion device and a method for manufacturing a rubber extrudate and particularly relates to a rubber extrusion device and a method for manufacturing a rubber extrudate capable of suppressing unintended curvature of a rubber extrudate while maintaining a predetermined position at which the rubber extrudate is extruded.

BACKGROUND ART

In a case where a rubber product such as a tire is manufactured, an extrusion step is available in which unvulcanized rubber is extruded by a rubber extrusion device. A screw installed inside a rubber extrusion device plasticizes unvulcanized rubber and feeds plasticized unvulcanized rubber into an extrusion flow path formed in a head at a leading end. A die having an extrusion port with a desired shape is installed at the leading end of the head, and unvulcanized rubber passes through the extrusion port. A rubber extrudate formed into the desired shape is thus manufactured (for example, see Japan Unexamined Patent Publication Nos. 2008-126560 and 2013-216069).

Different types of rubber have different rubber physical properties, and even for the same type of rubber, rubber physical properties vary among lots to some degree. In addition, extrusion conditions and the like vary among lots. Due to these variations, even in a case where the unvulcanized rubber is extruded using the same die, the rubber extrudate may be curved in an unintended direction with respect to the extrusion direction, preventing rubber extrudates with the desired shape from being obtained. In such a case, extra working man-hours are required to modify the back side shape of the die and to adjust the extrusion conditions and the like each time.

SUMMARY

The present technology provides a rubber extrusion device and a method for manufacturing a rubber extrudate capable of suppressing unintended curvature of a rubber extrudate while maintaining a predetermined position at which the rubber extrudate is extruded.

A rubber extrusion device of an embodiment of the present technology includes: a cylinder with a cylindrical shape; a screw disposed in an internal space of the cylinder; a head being installed at a leading end of the cylinder and having an extrusion flow path that communicates with the internal space; a die being disposed in front of the extrusion flow path and having an extrusion port that communicates with the extrusion flow path, wherein the rubber extrusion device includes a control plate, the control plate being interposed between the head and the die and having an adjustment flow path that communicates with the extrusion flow path and the extrusion port, and includes a moving unit, the moving unit sliding the control plate along and between the head and the die; and by sliding the control plate, the position of a communication region of the extrusion flow path with respect to the adjustment flow path at a leading end opening of the extrusion flow path changes.

A method for manufacturing a rubber extrudate of an embodiment of the present technology includes: feeding a rubber material into an internal space of a cylinder with a cylindrical shape; using a screw disposed in the internal space to extrude the rubber material forward while mixing and kneading the rubber material; feeding resultant unvulcanized rubber into an extrusion flow path formed in a head installed at a leading end of the cylinder; and extruding the unvulcanized rubber from an extrusion port as a rubber extrudate, the extrusion port being formed in a die disposed in front of the extrusion flow path, wherein a control plate, the control plate having an adjustment flow path that communicates with the extrusion flow path and the extrusion port, is interposed between the head and the die; the control plate is slid along and between the head and the die to change the position of a communication region of the extrusion flow path with respect to the adjustment flow path at a leading end opening of the extrusion flow path, setting the control plate at a desired position; and the unvulcanized rubber passes through the extrusion flow path and the adjustment flow path and is extruded from the extrusion port, reducing an amount of curvature of the rubber extrudate with respect to an extrusion direction.

According to an embodiment of the present technology, by sliding the control plate along and between the head and the die, the position of the communication region of the extrusion flow path with respect to the adjustment flow path of the control plate at the leading end opening of the extrusion flow path of the head changes. Accordingly, when the unvulcanized rubber passes through the extrusion flow path and the adjustment flow path and is extruded from the extrusion port, the pressure distribution (fluid flow distribution) changes, and the curvature of the rubber extrudate can be adjusted. Thus, by sliding the control plate such that the rubber extrudate is curved in a direction opposite to the direction of unintended curvature, the unintended curvature of the rubber extrudate can be suppressed.

Further, since it is sufficient to simply slide the control plate while the die is fixed at a given position without moving, the position where the rubber extrudate is extruded (extrusion port) can be maintained at a predetermined position. Accordingly, the line for conveying the rubber extrudate to the next step can be set to a given position, and thus it is not necessary to make a change to the conveying line to accommodate the sliding of the control plate.

DETAILED DESCRIPTION

Figure 1:
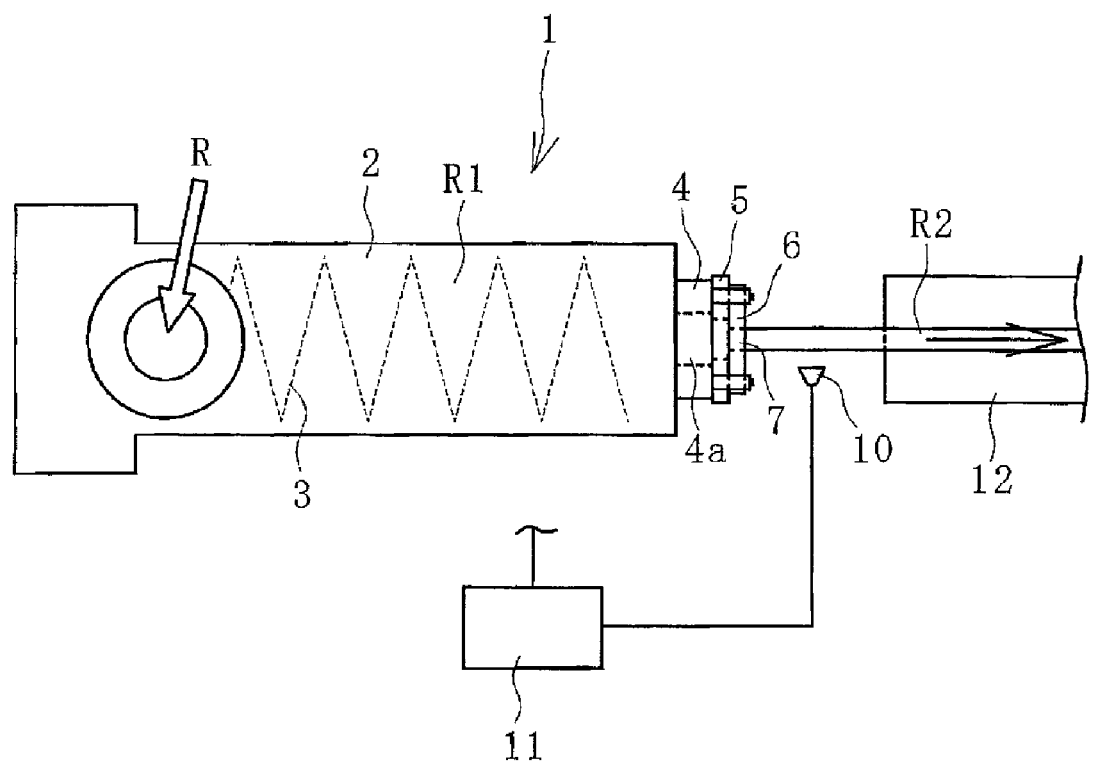
FIG. 1 is an explanatory diagram schematically illustrating a rubber extrusion device of an embodiment of the present technology in a plan view.

A rubber extrusion device and a method for manufacturing a rubber extrudate according to an embodiment of the present technology will be described below based on illustrated embodiments.

A rubber extrusion device 1 of an embodiment of the present technology illustrated in FIG. 1 to FIG. 4 includes a cylinder 2 with a cylindrical shape, a screw 3 disposed inside the cylinder 2, and a head 4 disposed at a leading end of the cylinder 2. The head 4 includes an extrusion flow path 4a penetrating the head 4 in a longitudinal direction. A die 6 is attached in front of the head 4 with a control plate 5 interposed. The rubber extrusion device 1 includes a moving unit 8 that slides the control plate 5 along and between the head 4 and the die 6. Note that in FIG. 1, the moving unit 8 and the like are omitted and not illustrated.

In the embodiment, the rubber extrusion device 1 further includes a sensor 10 and a control unit 11 to which detection data from the sensor 10 is input. A conveyor device 12 is disposed in front of the die 6.

In the diagrams, a horizontal direction and a vertical direction are indicated in an X arrow direction and a Y arrow direction, respectively, as a direction along and between the head 4 and the die 6. The X arrow direction and the Y arrow direction are orthogonal to each other, and the X arrow direction and the Y arrow direction are orthogonal to the direction in which the extrusion flow path 4a extends. The direction in which the control plate 5 slides is not limited to the X arrow direction or the Y arrow direction, and may be an oblique direction along the head 4 and the die 6.

Figure 4:
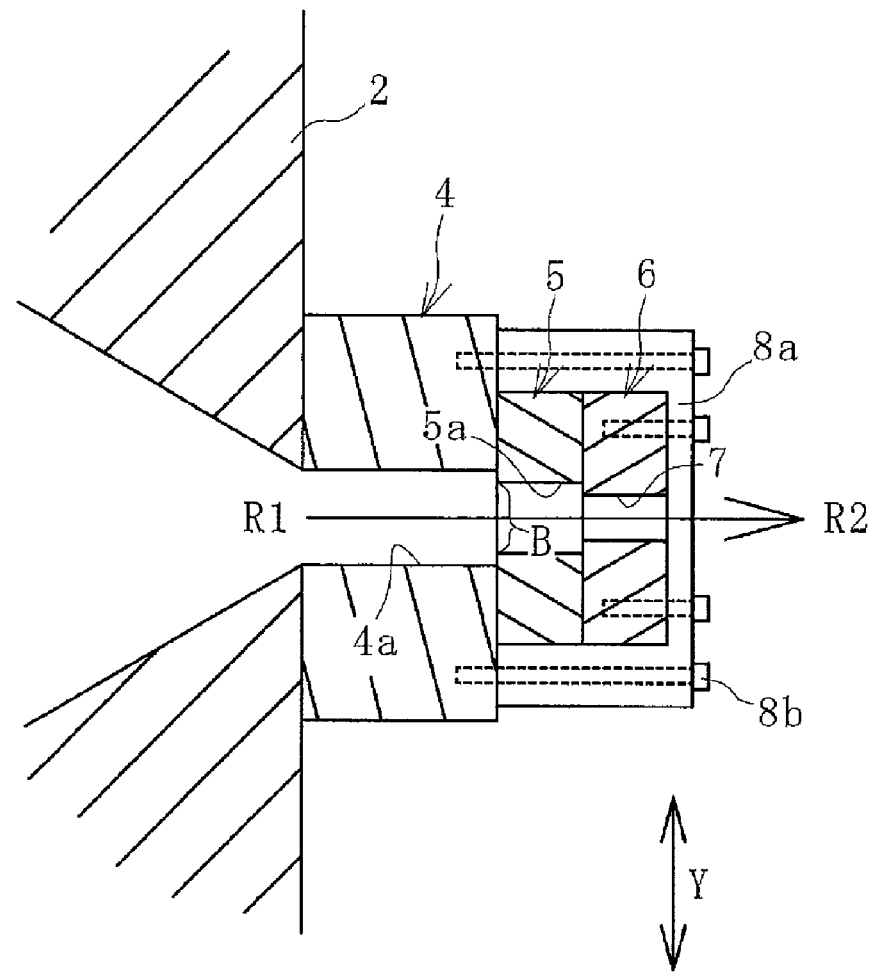
FIG. 4 is an explanatory diagram illustrating inside of the periphery of the head in a cross-sectional view taken along A-A of FIG. 2.

As illustrated in FIG. 4, at a leading end portion of the cylinder 2, an internal space is narrower toward the front. The extrusion flow path 4a is in communication with the internal space of the cylinder 2.

The control plate 5 is, for example, a metal plate-like body and has an adjustment flow path 5a penetrating the control plate 5 in the longitudinal direction. The control plate 5, which is sandwiched between the head 4 and the die 6 that are fixed in given positions without moving, slides against a leading end surface of the head 4 and a back end surface of the die 6. Therefore, at least one of the surfaces of the head 4 or of the control plate 5 facing each other; or at least one of the surfaces of the die 6 or of the control plate 5 facing each other is preferably a surface that underwent low friction treatment such as fluororesin coating or one that is a low friction material.

Figure 2:
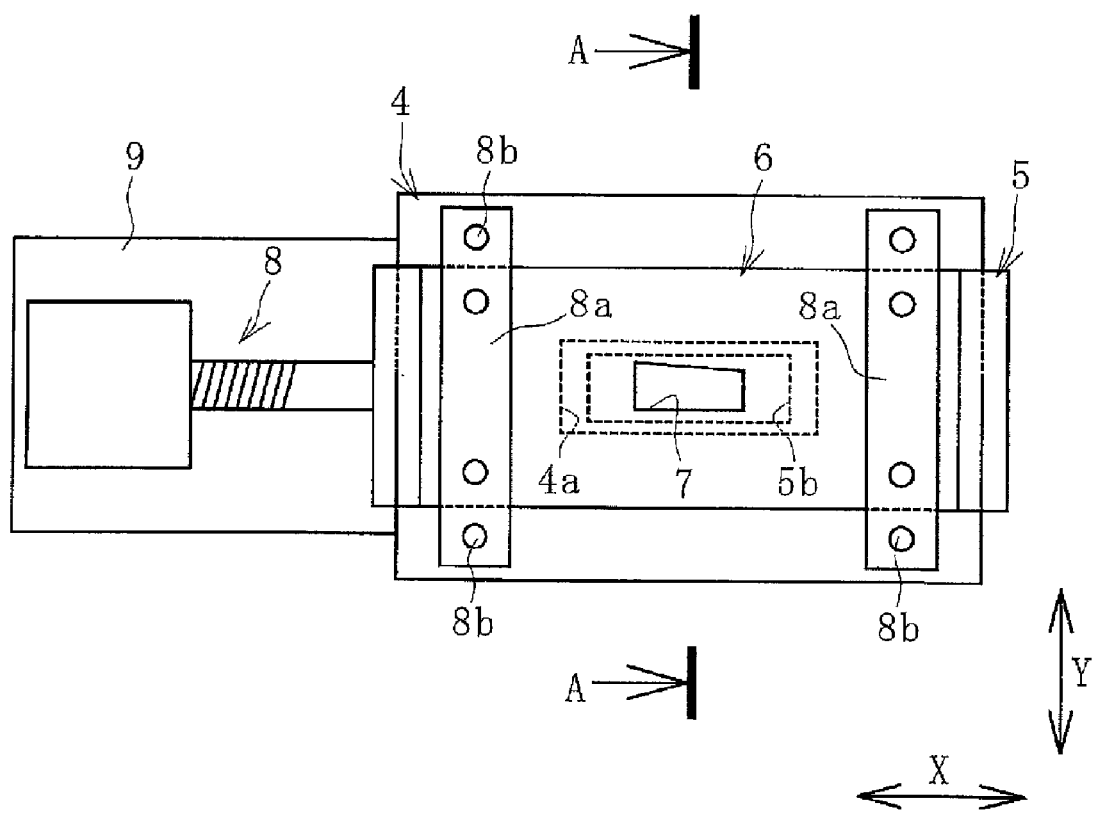
FIG. 2 is an explanatory diagram illustrating a periphery of a head of FIG. 1 in a front view.
Figure 3:
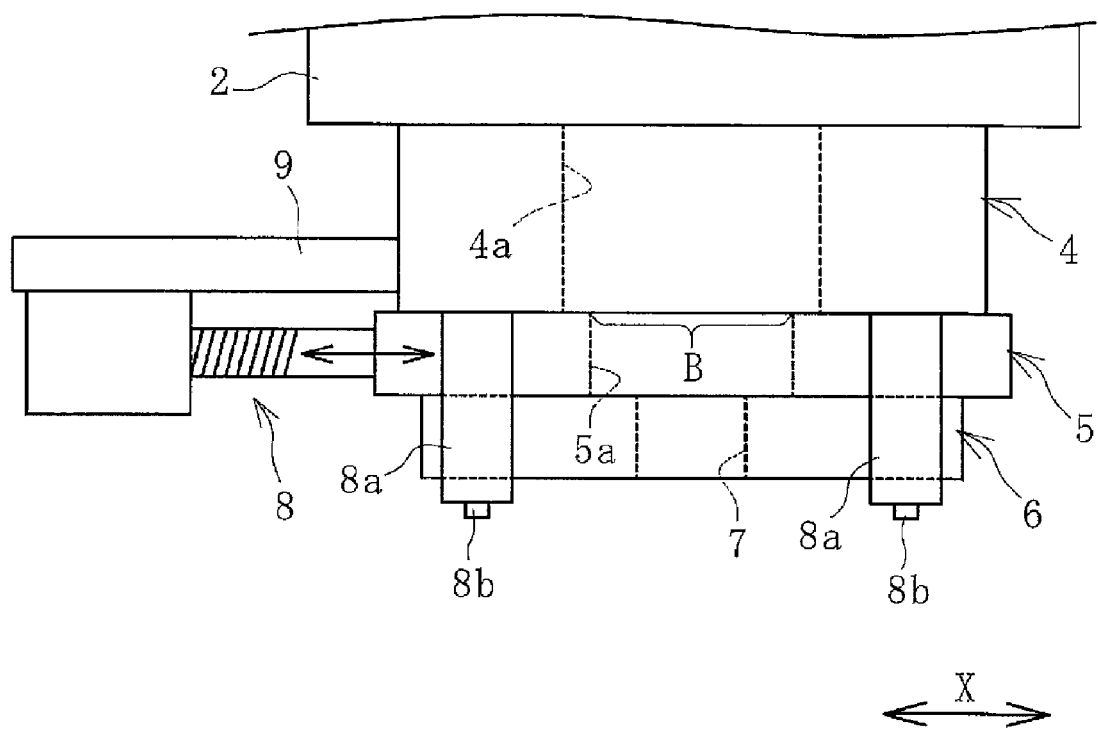
FIG. 3 is an explanatory diagram illustrating the periphery of the head of FIG. 1 in a plan view.

The die 6 has an extrusion port 7 penetrating the die 6 in the longitudinal direction. In the embodiment, the extrusion port 7 has a trapezoidal shape extending in the width direction in a front view as illustrated in FIG. 2 and is formed into a left-right asymmetrical shape. The extrusion port 7 is not limited to this shape, and a desired shape such as a circle, an ellipse, a semicircle, a square, a rectangle, or the like is employed.

The die 6 is fixed to the front of the head 4 via a holding member 8a. In the embodiment, the die 6 is fixed by a plurality of fixing bolts 8b to two holding members 8a disposed at an interval in the horizontal direction of the die 6, and each one of the holding members 8a is fixed to the head 4 by the plurality of fixing bolts 8b.

The extrusion flow path 4a, the adjustment flow path 5a, and the extrusion port 7 are in communication. Thus, unvulcanized rubber R1 that is pushed through the internal space of the cylinder 2 into the extrusion flow path 4a passes through the adjustment flow path 5a and extruded through the extrusion port 7 as a rubber extrudate R2. In the embodiment, the cross-sectional areas of the extrusion flow path 4a, the adjustment flow path 5a, and the extrusion port 7 are sequentially reduced.

A fixing plate 9 is installed on a left side surface of the head 4 so as to protrude outward, and the moving unit 8 is installed on the fixing plate 9. In the embodiment, the moving unit 8 includes a servo motor and a ball screw rotated and moved in the horizontal direction by the servo motor, and a tip of the ball screw is connected to a left side surface of the control plate 5.

In addition, for example, a hydraulic cylinder or the like may be adopted as the moving unit 8. The installation location of the moving unit 8 is not limited to the left side of the head 4, but can be a freely selectable position, for example, a right side of the head 4.

Actuation of the moving unit 8 moves the ball screw left and right in the horizontal direction, and thus, the control plate 5 slides in the horizontal direction with respect to the head 4 and the die 6. Accordingly, a position of a communication region B of the extrusion flow path 4a, with respect to the adjustment flow path 5a at a leading end opening of the extrusion flow path 4a, changes. The control plate 5 can be fixed at a desired position to which it is slid. The actuation of the moving unit 8 is controlled by the control unit 11 based on the detection data from the sensor 10. Thus, control of the control unit 11 allows the control plate 5 to slide and to be fixed to the desired position.

A procedure of a method for manufacturing a rubber extrudate according to an embodiment of the present technology will be described below.

In a case where the rubber extrudate R2 is manufactured by the rubber extrusion device 1, a predetermined amount of a rubber material R such as raw rubber and a compounding agent is fed into the internal space of the cylinder 2. The rubber material R is mixed and kneaded by the rotating screw 3. The unvulcanized rubber R1 extruded forward by the screw 3 is softened to some degree (plasticized) and fed into the extrusion flow path 4a. The unvulcanized rubber R1 then passes through the extrusion flow path 4a.

The leading end opening of the extrusion flow path 4a is partially covered by a control plate 5, and a leading end opening of the adjustment flow path 5a is partially covered by the die 6. The unvulcanized rubber R1 that has passed through the extrusion flow path 4a and the adjustment flow path 5a is extruded from the extrusion port 7 having a desired shape, thereby manufacturing the rubber extrudate R2 that is formed into a desired cross-sectional shape. For example, a rubber extrudate R2, such as a strip-like tire member formed into a predetermined shape, is manufactured. The rubber extrudate R2 is extruded while being conveyed to the next step by the conveyor device 12.

Figure 5:
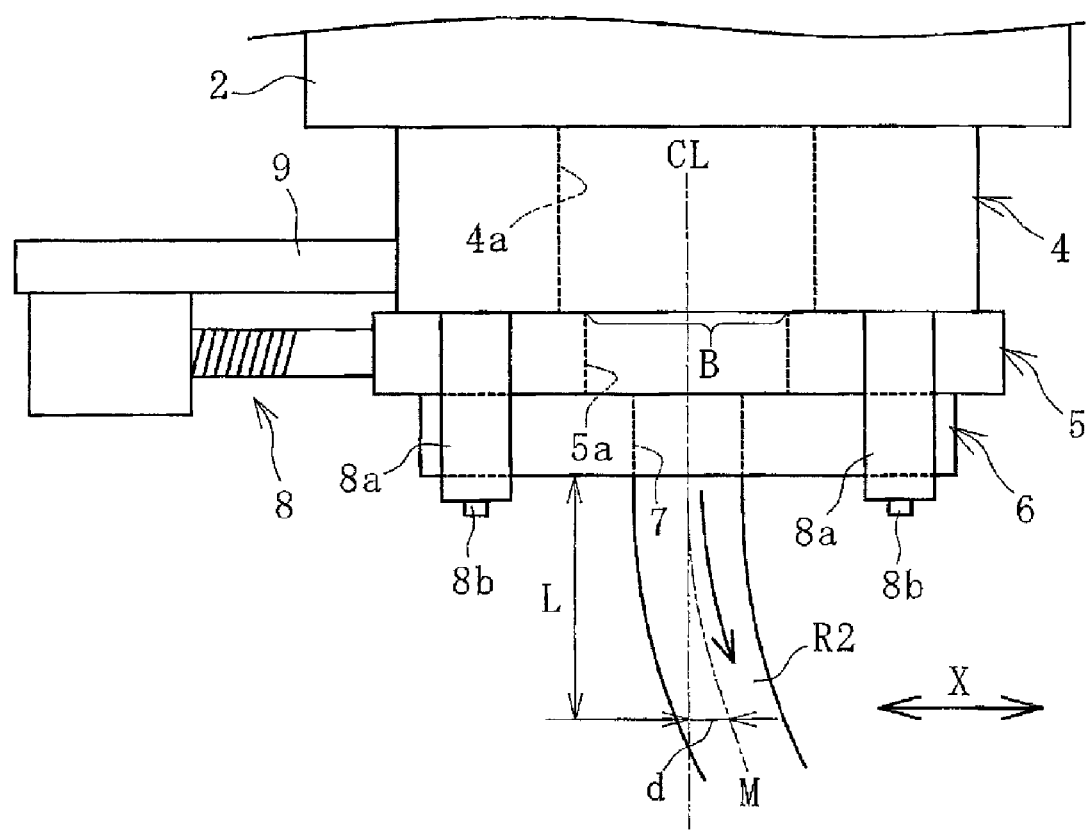
FIG. 5 is an explanatory diagram illustrating a state in which a rubber extrudate is being extruded, with the control plate of FIG. 3 disposed in the center of the head in the horizontal direction.

In a case where the unvulcanized rubber R1 has a variation due to varying rubber physical properties or due to extrusion conditions or the like, the rubber extrudate R2 may be curved in an unintended direction (horizontal direction or vertical direction) as illustrated in FIG. 5 even in a case where the rubber extrudate is extruded from the extrusion port 7 with the same shape. Note that, in FIG. 5 to FIG. 7, a center position of the extrusion port 7 in the horizontal direction (width direction) is indicated by a dot-dash line CL, and a center position of the rubber extrudate R2 in the horizontal direction (width direction) is indicated by a dot-dash line M. In this embodiment, the center position of the extrusion flow path 4a in the horizontal direction coincides with the dot-dash line CL. In FIG. 5, at a position located at a distance L forward from the die 6, the center position M of the rubber extrudate R2 in the horizontal direction is shifted rightward by a misalignment amount d with respect to the center position CL of the extrusion port 7 in the horizontal direction, and the rubber extrudate R2 is curved rightward (has an amount of curvature d).

Curving of the rubber extrudate R2 in a specific direction as illustrated in FIG. 5 instead of straight extrusion is expected to be caused by a combination of various factors such as a variation in the rubber physical properties of the unvulcanized rubber R1, extrusion conditions (pressure, temperature, flow velocity, and the like), matching between the cylinder 2 and the screw 3, and the like.

Figure 6:
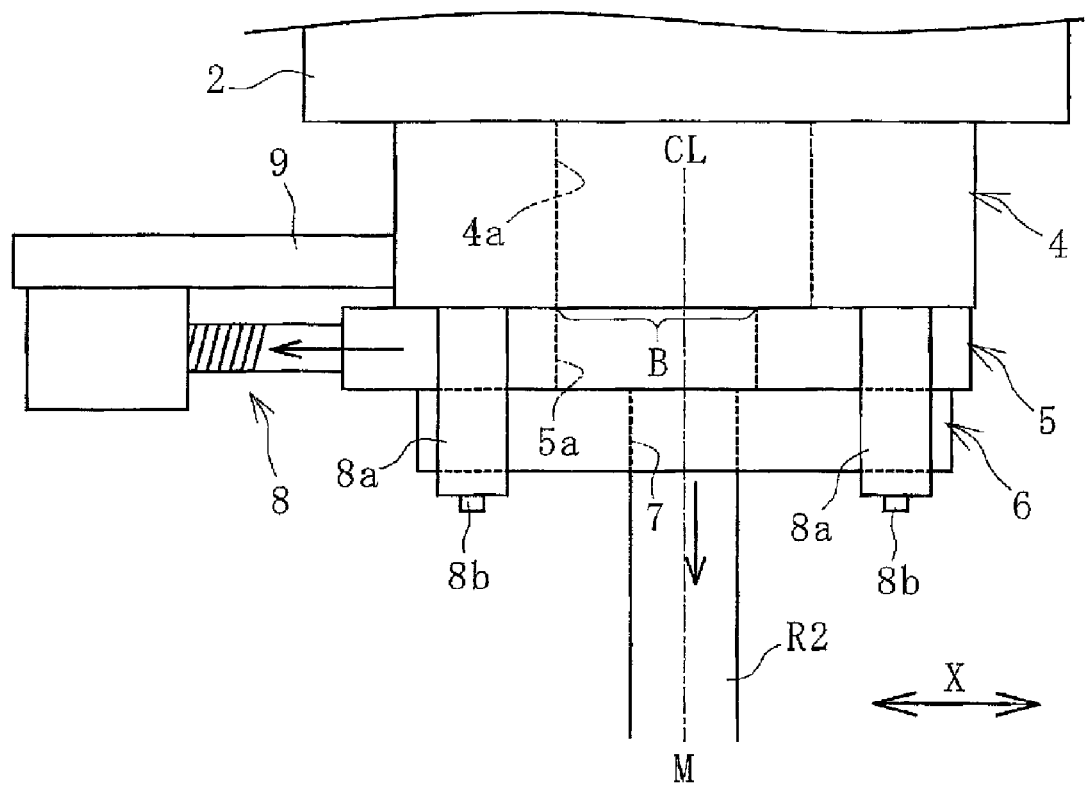
FIG. 6 is an explanatory diagram illustrating a state in which a rubber extrudate is being extruded, with the control plate of FIG. 5 slid leftward with respect to the head.

Thus, in an embodiment of the present technology, the control plate 5 positioned as illustrated in FIG. 5 is moved leftward with respect to the head 4 and the die 6 as illustrated in FIG. 6. The extruded unvulcanized rubber R1 has a different pressure and flow rate (has a pressure distribution and fluid flow distribution) in the direction orthogonal to the extrusion direction in the extrusion flow path 4a. Thus, by changing the position of the communication region B of the extrusion flow path 4a with respect to the adjustment flow path 5a at the leading end opening of the extrusion flow path 4a, the pressure distribution (fluid flow distribution) changes when the unvulcanized rubber passes through the extrusion flow path 4a and the adjustment flow path 5a and then is extruded from the extrusion port 7. Correspondingly, a leftward curving force acts on the rubber extrudate R2 to allow the curvature of the rubber extrudate R2 to be adjusted.

Figure 7:
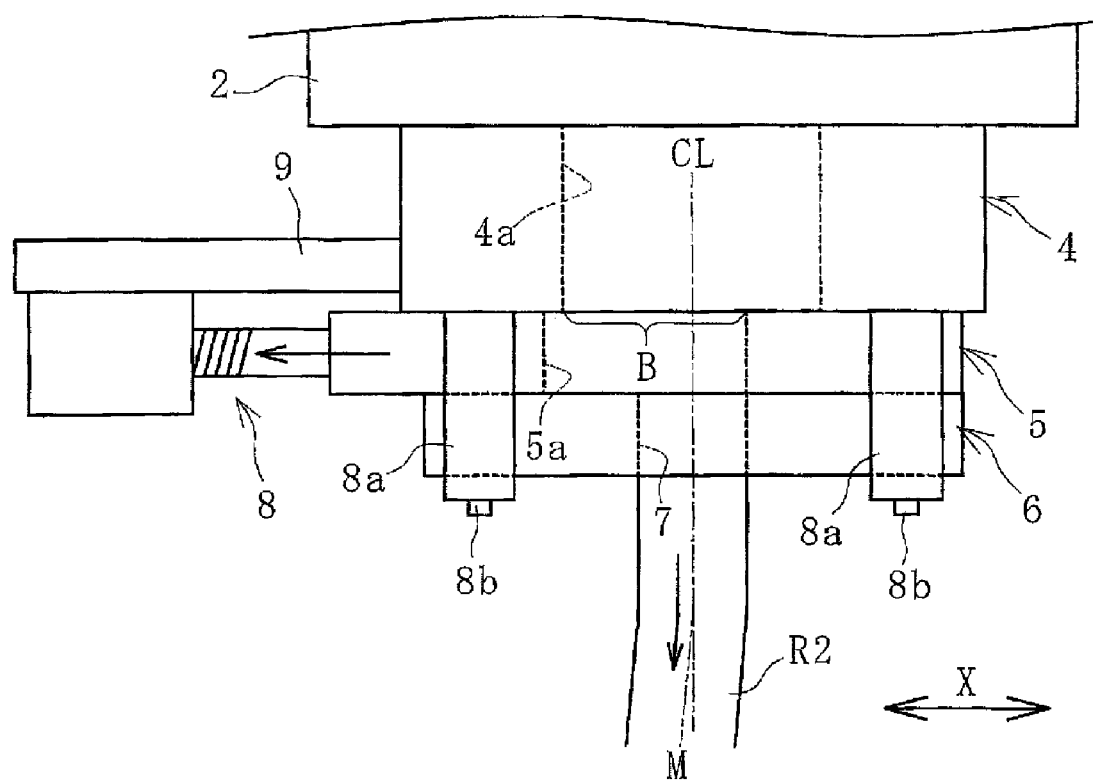
FIG. 7 is an explanatory diagram illustrating a state in which a rubber extrudate is being extruded, with the control plate of FIG. 6 slid further leftward with respect to the head.

In a case where the control plate 5 is slid one level leftward with respect to the head 4 and the die 6, as illustrated in FIG. 7, the leftward curving force acting on the rubber extrudate R2 becomes excessively strong, curving the rubber extrudate R2 leftward. Thus, in an embodiment of the present technology, a position of the control plate 5 is appropriately adjusted to establish a fixed state as illustrated in FIG. 6. Then, the rubber extrudate R2 is extruded. By sliding the control plate 5 along and between the head 4 and the die 6 such that a force acts to cause the rubber extrudate R2 to curve in a direction opposite to the direction of unintended curvature, the unintended curvature of the rubber extrudate R2 can be suppressed. As a result, the curvature of the rightward curved rubber extrudate R2 is corrected, enabling obtainment of a rubber extrudate R2 formed into a desired straight shape corresponding to the shape of the extrusion port 7.

Thus, according to an embodiment of the present technology, even in a case where a variation attributed to rubber physical properties or extrusion conditions or the like occurs, a rubber extrudate R2 having a desired shape suppressed from being unintentionally curved can be stably manufactured by controlling the position of the control plate 5 along and between the head 4 and the die 6. Additionally, an embodiment of the present technology eliminates or minimizes a need for excess work performed in the related art to modify the shape of the die 6 by machining or to adjust the extrusion conditions or the like in each case of a variation attributed to the rubber physical properties or the extrusion conditions or the like. This is advantageous in improving the productivity of the rubber extrudate R2.

Moreover, in order to correct unintended curvature of the rubber extrudate R2, sliding the control plate 5 while the die 6 is fixed in a given position suffices. Thus, the position where the rubber extrudate R2 is extruded (extrusion port 7) can be maintained at a predetermined position. Accordingly, the line for conveying the rubber extrudate R2 to the next step (such as the conveyor device 12) can be set to a given position, so it is not necessary to make a change to the conveying line to accommodate the sliding of the control plate 5 each time. Thus, the layout of the step after the extrusion step is not affected. Additionally, an embodiment of the present technology can be easily applied to an existing rubber extruder since it is sufficient as long as the control plate 5 is interposed between the head 4 and the die 6 and is slidable.

When the control plate 5 slides from the position in FIG. 5 to the position in FIG. 6, only the position of the communication region B of the extrusion flow path 4a with respect to the adjustment flow path 5a at the leading end opening of the extrusion flow path 4a changes, while the area of the communication region B does not change. However, when the control plate 5 slides from the position in FIG. 6 to the position in FIG. 7, not only the position of the communication region B changes, but the area of the communication region B also changes. When the position and the area of the communicating region B changes in such a manner, the pressure distribution (fluid flow distribution) of the unvulcanized rubber R1 when the unvulcanized rubber R1 is extruded from the extrusion port 7 after passing through the extrusion flow path 4a and the adjustment flow path 5a can be changed more greatly. Thus, this is advantageous in improving the correction effect on the curvature of the rubber extrudate R2.

In the embodiment, at a position located at the distance L forward from the die 6, the sensor 10 successively detects the misalignment amount d of the center position M of rubber extrudate R2 in the horizontal direction with respect to the center position CL of the extrusion port 7 in the horizontal direction. In the control unit 11, the position of the control plate 5 (adjustment flow path 5a) is successively controlled so that the misalignment amount d approaches zero (feedback control is performed). The misalignment amount d of the rubber extrudate R is largest at a position located at a distance L of approximately 500 mm, and thus, the sensor 10 detects the misalignment amount d, for example, at a position located at a distance L of from 400 mm to 600 mm.

When correlation data, between the fluctuation parameters such as rubber physical properties and extrusion conditions, the position of the control plate 5 slid along and between the head 4 and the die 6, and the curvature of the rubber extrudate R2 when extruded at that position, are accumulated to a certain degree, the correlation data are input to the control unit 11. Then, when the extrusion of the rubber extrudate R2 is started, the actual fluctuation parameters are input into the controller 11, based on these data and the previously input correlation data described above, the control plate 5 is preset to be disposed at a predetermined position, and the rubber extrudate R2 is extruded into a desired shape without having unintended curvature. The feedback control described above is then performed.

In a case where the rubber extrudate R2 used, for example, as a tire component is manufactured using an embodiment of the present technology, the rubber extrudate R2 can have the desired shape suppressed from being unintentionally curved. Thus, manufacturing a tire using the rubber extrudate R2 is advantageous in improving the uniformity of the tire.

The direction in which the control plate 5 is slid is preferably set in one direction extending in an elongated shape of the extrusion port 7 as in this embodiment (the direction in which the extrusion port 7 extends the longest in the front view). In this way, it is easy to greatly change the pressure distribution (fluid flow distribution) of the unvulcanized rubber R1 when passing through from the extrusion flow path 4*a* to the adjustment flow path 5*a* and the extrusion port 7. Thus, the unintended curvature of the rubber extrudate R2 is easily suppressed.

The control plate 5 is not limited to one, and a plurality of the control plates 5 may be provided. By independently sliding each one of the plurality of control plates 5, the curvature of the rubber extrudate R2 can be more finely adjusted.

Figure 8:
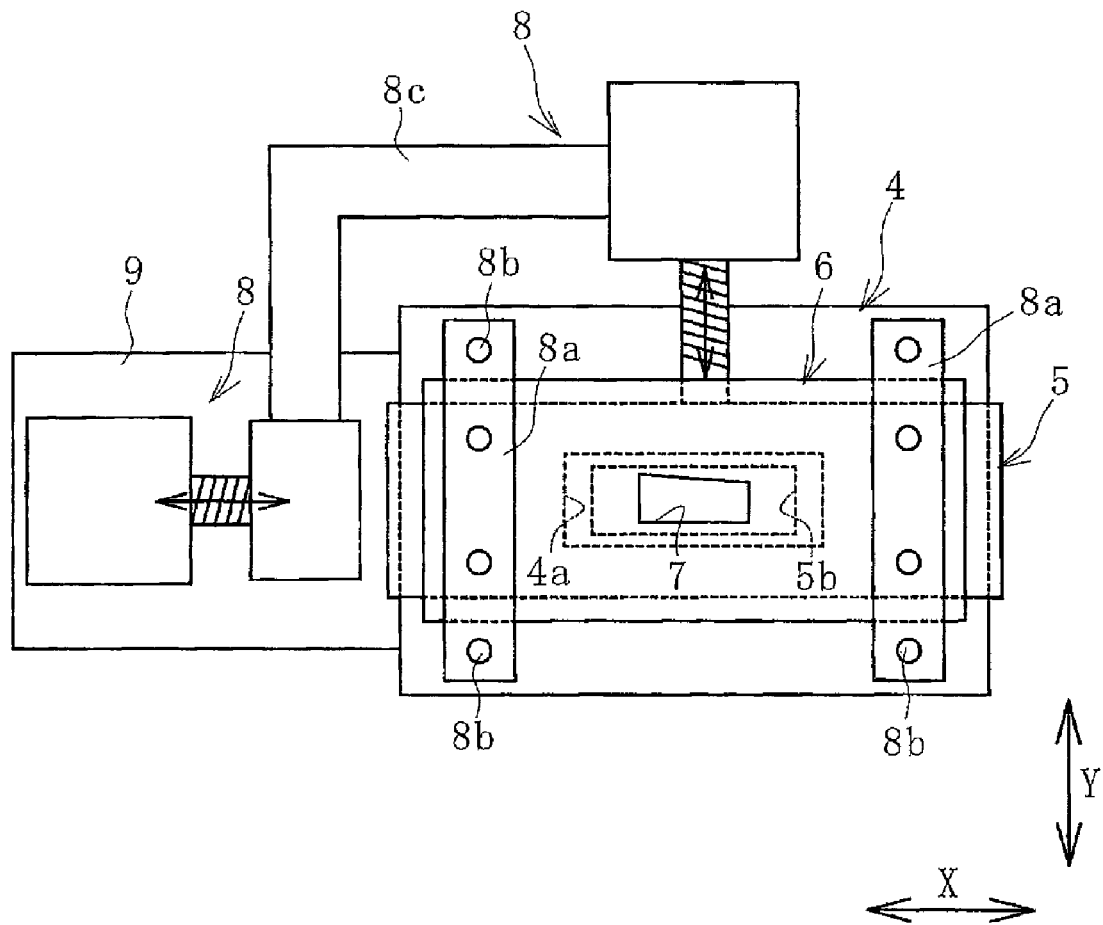
FIG. 8 is an explanatory diagram illustrating another embodiment of a rubber extrusion device in a front view.

In another embodiment of the rubber extrusion device 1 illustrated in FIG. 8, the control plate 5 can be moved not only in the horizontal direction but also in the vertical direction relative to the head 4 and the die 6. Specifically, the moving unit 8 is disposed on an upper side in addition to the left side of the head 4. The moving unit 8 disposed on the upper side includes a servo motor and a ball screw rotated and moved in the axial direction by the servo motor, and a tip of the ball screw is connected to an upper surface of the control plate 5. The moving unit 8 is connected by a connecting arm 8*c* to the other moving unit 8 disposed on the left side of the head 4. The control plate 5 is sandwiched between the head 4 and the die 6 so as to be able to slide in the horizontal direction and the vertical direction.

The other moving unit 8 disposed on the left side of the control plate 5 slides the moving unit 8 and the control plate 5 disposed above the control plate 5 along the head 4 and the die 6 in the horizontal direction via the connecting arm 8*c*. Thus, in the embodiment, the control plate 5 is movable in a freely selectable direction along and between the head 4 and the die 6.

In the embodiment, further fine changes can be made to the pressure distribution (fluid flow distribution) of the unvulcanized rubber R1 when the unvulcanized rubber R1 passes through from the extrusion flow path 4*a* to the adjustment flow path 5*a* and the extrusion port 7. This allows the curvature of the rubber extrudate R2 to be more specifically adjusted. Thus, the unintended curvature of the rubber extrudate R2 can be reliably suppressed with greater accuracy. The various specifications described above in the embodiments can also be applied to the present embodiment.

The invention claimed is:

1. A rubber extrusion device comprising: a cylinder with a cylindrical shape; a screw disposed in an internal space of the cylinder; a head being installed at a leading end of the cylinder and having an extrusion flow path that communicates with the internal space; a die being installed in front of the extrusion flow path and having an extrusion port that communicates with the extrusion flow path, wherein, the rubber extrusion device comprises a control plate, the control plate being interposed between a leading end surface of the head and a back end surface of the die such that the die does not contact the head, the back end surface of the die being a portion of the die closest to the head, the control plate having an adjustment flow path that communicates with the extrusion flow path and the extrusion port, and comprises a moving unit, the moving unit sliding the control plate along and between the head and the die that are fixed in given positions without moving; and by sliding the control plate, a position of a communication region of the extrusion flow path with respect to the adjustment flow path at a leading end opening of the extrusion flow path changes, thus reducing an amount of curvature of the rubber extrudate with respect to an extrusion direction.

2. The rubber extrusion device according to claim 1, wherein, by sliding the control plate, an area of the communication region of the extrusion flow path with respect to the adjustment flow path at the leading end opening of the extrusion flow path changes.

3. The rubber extrusion device according to claim 1, wherein the extrusion port is elongated in one direction, and the control plate can be slid in the one direction by the moving unit.

4. The rubber extrusion device according to claim 1, wherein the control plate can be slid in a freely selectable direction by the moving unit.

5. The rubber extrusion device according to claim 1, further comprising a control unit that allows the control plate to slide to a desired position by controlling actuation of the moving unit.

6. The rubber extrusion device according to claim 1, further comprising a sensor that detects an amount of curvature with respect to an extrusion direction of a rubber extrudate extruded from the extrusion port, wherein the control unit allows the control plate to slide to a desired position based on a detection data of the sensor.

7. A method for manufacturing a rubber extrudate, comprising: feeding a rubber material into an internal space of a cylinder with a cylindrical shape; using a screw disposed in the internal space to extrude the rubber material forward while mixing and kneading the rubber material; feeding resultant unvulcanized rubber into an extrusion flow path formed in a head installed at a leading end of the cylinder; and extruding the unvulcanized rubber from an extrusion port as a rubber extrudate, the extrusion port being formed in a die disposed in front of the extrusion flow path, wherein a control plate, the control plate having an adjustment flow path that communicates with the extrusion flow path and the extrusion port, is interposed between a leading end surface of the head and a back end surface of the die that are fixed in given positions without moving, where the die does not contact the head and the back end surface of the die is a portion of the die closest to the head;

the control plate is slid along and between the head and the die to change a position of a communication region of the extrusion flow path with respect to the adjustment flow path at a leading end opening of the extrusion flow path, thus setting the control plate at a desired position; and the unvulcanized rubber passes through the extrusion flow path and the adjustment flow path and is extruded from the extrusion port, thus reducing an amount of curvature of the rubber extrudate with respect to an extrusion direction.

8. The rubber extrusion device according to claim 2, wherein the extrusion port is elongated in one direction, and the control plate can be slid in the one direction by the moving unit.

9. The rubber extrusion device according to claim 8, wherein the control plate can be slid in a freely selectable direction by the moving unit.

10. The rubber extrusion device according to claim 9, further comprising a control unit that allows the control plate to slide to a desired position by controlling actuation of the moving unit.

11. The rubber extrusion device according to claim 10, further comprising a sensor that detects an amount of curvature with respect to an extrusion direction of a rubber extrudate extruded from the extrusion port, wherein the control unit allows the control plate to slide to a desired position based on a detection data of the sensor.

\* \* \* \* \*